(12) United States Patent
Abdou-Sabet et al.

(10) Patent No.: US 6,174,962 B1
(45) Date of Patent: Jan. 16, 2001

(54) FREE RADICALLY CURED THERMOPLASTIC VULCANIZATES OF A POLYOLEFIN AND A ACRYLATE MODIFIED PARAALKYLSTYRENE/ISOOLEFIN COPOLYMER

(75) Inventors: Sabet Abdou-Sabet; Raman Patel, both of Akron, OH (US); Hsien-Chang Wang, Bellaire, TX (US)

(73) Assignees: Advanced Elastomer Systems, L.P., Akron, OH (US); Exxon Chemical Patents Inc., Baytown, TX (US)

( * ) Notice: Under 35 U.S.C. 154(b), the term of this patent shall be extended for 0 days.

(21) Appl. No.: 09/325,858

(22) Filed: Jun. 4, 1999

(51) Int. Cl.$^7$ ............... C08F 8/00; C08L 33/02; C08L 23/04; C08L 25/02
(52) U.S. Cl. ............ 525/191; 525/192; 525/221; 525/240; 525/241
(58) Field of Search ............... 525/191, 192, 525/221, 240, 241

(56) References Cited

U.S. PATENT DOCUMENTS

| 5,013,793 | 5/1991 | Wang et al. . |
| 5,162,445 | 11/1992 | Powers et al. . |

OTHER PUBLICATIONS

"Functionalized PMS/IB copolymers offer wide range of properties" by H. C. Wang and K. W. Powers, *Elastomerics*, Jan./Feb. 1992, by Communication Channels, Inc., Atlanta, GA USA.

"Functionalized PMS/IB copolymers offer wide range of properties–Part II" by H. C. Wang and K. W. Powers, *Elastomerics*, Jan./Feb. 1992 by Communication Channels Inc., Atlanta, GA USA.

*Primary Examiner*—Nathan M. Nutter
(74) *Attorney, Agent, or Firm*—Daniel J. Hudak; William A. Skinner

(57) ABSTRACT

A thermoplastic vulcanizate composition containing a thermoplastic and a functionalized copolymer of para-alkylstyrene-isoolefin is free radically cured, as for example, with a peroxide to yield a product having low impurities and good clarity. The thermoplastic typically can be a polyolefin.

14 Claims, No Drawings

FREE RADICALLY CURED THERMOPLASTIC VULCANIZATES OF A POLYOLEFIN AND A ACRYLATE MODIFIED PARAALKYLSTYRENE/ISOOLEFIN COPOLYMER

FIELD OF THE INVENTION

The present invention relates to the vulcanization of functionalized para-alkylstyrene/isoolefin copolymers in the presence of thermoplastics with a free radical curing agent such as a peroxide. Some of the alkyl groups of the copolymer are functionalized with an unsaturated compound such as an unsaturated acid.

BACKGROUND OF THE INVENTION

Heretofore, the curing of thermoplastic vulcanizates generally utilize cure systems such as sulfur or various resins. Such curatives generally discolored upon ultraviolet light exposure and did not yield compositions having good ultraviolet light resistance.

SUMMARY OF THE INVENTION

The thermoplastic vulcanizate composition generally has a continuous phase of a thermoplastic and a discontinuous rubber phase comprising a functionalized copolymer of para-alkylstyrene/isoolefin so that the rubber can be cured by a free radical mechanism. Cure can be obtained utilizing any free radical cure source such as radiation, electrical, microwave, or desirably decomposition of various organic peroxides. The various components are dynamically vulcanized at a temperature above the melting point of the thermoplastic or the thermoplastic elastomer.

DETAILED DESCRIPTION

The thermoplastic polymer is a polyolefin having a melting point of at least 120° C., and preferably at least 160 or 200° C. up to about 220° C. The one or more polyolefin thermoplastic polymers are made or derived from α-olefin monomers having from 2 to 8 carbon atoms. Such polymers are desirably crystalline, high molecular weight solid polymers made in accordance with conventional processes. Moreover, such polymers are generally isotactic and syndiotactic resins. Examples of suitable polyolefin thermoplastic polymers include polyethylene, polypropylene, poly(1-butene), poly(1-pentene), poly(1-hexene), poly(2-methyl-1-propene), poly(3-methyl-1-pentene), poly(4-methyl-1-pentene), poly(5-methyl-1-hexene), and mixtures thereof, with syndiotactic polypropylene being preferred.

A preferred rubber is a functionalized copolymer of para-alkylstyrene/isoolefin wherein the olefin is derived from monomers containing a total of from 4 to 7 carbon atoms with isobutylene being preferred. The functionalized copolymer is generally made from a para-alkylstyrene/isoolefin copolymer wherein the alkyl group and contains a primary or secondary alkyl halide such as a primary or a secondary $C_1$ to $C_5$ alkyl bromide. The halide group is subsequently displaced via nucleophilic substitution by a nucleophilic molecule, oligomer or polymer. These grafting reactions are taught in U.S. Pat. No. 5,162,445 herein fully incorporated by reference. The copolymer repeat units derived from isobutylene can be from about 10 to about 99.8 wt. % of the copolymer before halogenation and/or grafting, desirably from about 50 to about 99.6 weight percent, and preferably from about 80 to about 99.5 wt. percent. The repeat units of para-alkylstyrene are thus from about 0.2 to about 90 wt. percent, desirably from about 0.4 to about 50 weight percent, and preferably from about 0.5 to about 20 wt. percent. The polymer before grafting can have a number average molecular weight from about 500 to about 25,000, 30,000 or 40,000.

The molecules, oligomers or polymers grafted onto the benzylic carbon atom by nucleophilic substitution need to have a nucleophilic group which can displace the halogen. The molecules, oligomers, or polymers desirably have more favorable blending characteristics with the thermoplastic phase of the thermoplastic vulcanizate than the rubber of the thermoplastic vulcanizate and thus act as a compatibilizing agent. Preferred functionalizing molecules, oligomers, or polymers include those derived from an unsaturated acid or a salt thereof. Suitable acids include acrylic or methacrylic acid, or unsaturated acids having a total of from 4 to 1 5 carbon atoms. As known to the art, the acid is first reacted to form a salt and the salt acrylate, etc., subsequently reacted with the alkyl styrene wherein the alkyl group contains a halogen. This approach is set forth in U.S. Pat. No. 5,473,017, hereby incorporated by reference, and as set forth in Example A thereof, small amounts of a benzophenone can also be incorporated. Preferred functionalizing agents are acrylate and/or methacrylate modified para-alkyl/isoolefin copolymers. Such acrylate modified para-alkylstyrene/isoolefin copolymers are commercially available from Exxon such as XP-50-16924, XP-50-15870, and the like. The number of styrene groups that are substituted or modified to contain unsaturation thereon so that the copolymer can be crosslinked is generally less than 12 percent, desirably less than 1 percent, and preferably less than 0.5 percent based upon the total number of styrene groups in the copolymer.

The amount of the one or more thermoplastic polymers to the total amount of one or more rubbers is generally from about 15 to about 75, desirably from about 20 to about 70, and preferably from about 25 to about 65 parts by weight per 100 parts by weight of total rubber.

The rubber is cured utilizing generally any type of free radical cure source, such as radiation, electrical or microwave, various organic compounds, with organic peroxides being preferred. Examples of suitable organic peroxides include diacyl peroxides, dialkyl peroxides, ketone peroxides, peroxydicarbonates, peroxy esters, and peroxy ketals. Examples of ketone peroxides include methyl ethyl ketone peroxide, benzoyl peroxide, cumene hydroperoxide, and 2,4-pentanedione peroxide. Examples of peroxydicarbonates include di-sec-butyl peroxydicarbonate, di-n-propyl peroxydicarbonate, di-2-ethyl hexyl peroxydicarbonate. Examples of peroxy esters include t-butyl and t-amyl peroxy neoesters (e.g., t-butyl peroxyneodecanoate, t-amyl peroxyneodecanoate, and t-butyl peroxypivalate). Other peroxy esters include t-butyl peroxy 2-ethyl hexanoate, t-butyl peroxyisobutyrate, t-butyl peroxyacetate, and t-butyl peroxybenzoate. Still other peroxides include di-benzoyl peroxide, dicumyl peroxide, 2,5-dimethyl-2,5-bis-(2-ethyl hexyl peroxy) hexane, t-amylperoxyoctoate, t-butyl peroxyoctoate, lauroyl peroxide, t-butyl peroxybenzoate, 1,1-bis-t-butyl peroxy cyclohexane, 1,1-bis-t-amyl peroxy cyclohexane, and dicumyl peroxide. Still other peroxides include 2,2'-bis (t-butyl peroxy) diisopropyl benzene, 2,5-dimethyl-2,5-di (t-butyl peroxy) hexane, ethyl 3,3-bis (t-butyl peroxy) butyrate, n-butyl 4,4-bis(t-butyl peroxy) valerate, and 2,5-dimethyl-2,5-di (t-butyl peroxy) hexene-3. Organic peroxides which are generally preferred in the present invention include 2,2'-bis (t-butyl peroxy) diisopropyl benzene, 2,5-dimethyl-2,5-di (t-butyl peroxy) hexane, and other high temperature decomposing peroxides.

The amount of the peroxide generally depends upon the amount of the rubber such as XP-50 and is typically from about 0.1 to about 3.0 parts by weight and preferably from about 0.2 to about 1.0 parts by weight per 100 parts by weight of the rubber.

The curatives effect crosslinking by reacting the functionalized or unsaturated group on the styrene repeat units with a similar unit on an adjacent polymer chain. Inasmuch as peroxide cures occur rapidly, there is little degradation, i.e., chain scission, of the various polymers. A clear blend can be produced since conventional curatives which often contain impurities need not be utilized. High clarity blends are desired for numerous medical applications such as tubing, hosing, clear liners, and the like. The thermoplastic elastomers of the present invention also generally have good UV stability or resistance and thus, if necessary, require only small amounts of additional UV stabilizers.

The thermoplastic vulcanizate compositions of the present invention, whether clear or not, can generally be used in any TPV applications such as seals, gaskets, boots and the like. They are also utilized for many automotive parts. Inasmuch as TPV compositions have fairly good air and/or water vapor barrier properties, they can be utilized whenever such is desirable.

Generally, when high clarity vulcanizates are desired, processing aids are generally not utilized. However, when clarity is not a factor, conventional additives can be utilized such as reinforcing and non-reinforcing fillers, extenders, antioxidants, stabilizers, rubber processing oil, extender oils, lubricants, plasticizers, anti-blocking agents, anti-static agents, waxes, foaming agents, pigments, flame retardants and other processing aids known in the rubber compounding art. Such additives can comprise up to about 60 weight percent of the total composition, and can be in the plastic phase, the rubber phase or both. Fillers and extenders which can be utilized include conventional inorganics such as calcium carbonate, clays, silica, talc, titanium dioxide, carbon black, and the like. The rubber processing oils generally are paraffinic, or naphthenic oils derived from petroleum fractions. The type that can be used in conjunction with the specific rubber or rubbers present in the compositions, and the quantity based on the total rubber content may range from zero to about 100 phr and preferably from about 10 to about 40 phr.

Partial or preferably complete cross-linking can be achieved by adding one or more of the above-noted rubber curatives to the blend of a thermoplastic and rubber and vulcanizing the rubber to a desired degree of cure under conventional vulcanizing conditions. The degree of cure of the elastomer or rubber of the present invention is generally at least 50, desirably from about 75 to about 100, and preferably 90 to 100 percent. By degree of cure, it is meant that the above indicated percent by weight of the rubber does not dissolve in cyclohexane at room temperature, i.e., 20° C.

It is preferred that the rubber be cross-linked by the process of dynamic vulcanization. As used in the specification and claims, the term "dynamic vulcanization" means a vulcanization or curing process for a rubber contained in a thermoplastic vulcanizate composition, wherein the rubber is vulcanized under conditions of shear at a temperature above the melting point of the thermoplastic component. The rubber is thus simultaneously cross-linked and dispersed as fine particles within the thermoplastic matrix although other morphologies may also exist. Dynamic vulcanization is effected by mixing the thermoplastic vulcanizate components at elevated temperature in conventional mixing equipment such as roll mills, Banbury mixers, Brabender mixers, continuous mixers, mixing extruders, and the like. The unique characteristic of dynamically cured compositions is that, notwithstanding the fact that the rubber component is partially or fully cured, the compositions can be processed and reprocessed by conventional plastic processing techniques such as extrusion, injection molding, blow molding and compression molding. Scrap or flashing can be salvaged and reprocessed.

The thermoplastic vulcanizate compositions of the present invention generally has good physical properties as other conventional dynamically vulcanized thermoplastic elastomers such as good tensile strength, good elongation, ultimate elongation as well as hardness. A notable property, as indicated above, is good clarity when a minimum or nil amount of various additives such as oils, plasticizers, and antioxidants were utilized.

The invention will be better understood by reference to the following examples, which serve to illustrate, but not limit, the present invention.

The following recipes set forth in Tables 1, 2, and 3 were prepared utilizing a Brabender mixer heated to a temperature of about 180° C. and 100 RPM. The acrylate modified XP-50 was charged to the mixer along with the polyolefin. The various additives noted in the table can be added at the same time. After 2 to 3 minutes of mixing, when the blend is fully homogenized as indicated by the torque leveling off, the curatives were added and the Brabender speed increased to 220 RPM. An increase in torque normally occurs and the blended compounds were mixed for an additional 4 to 6 minutes. The blend is then removed from the Brabender and pressed into a cold press to cool it and to obtain a sheet which is then molded and tested.

TABLE 1

| Material | 1 | 2 | 3 | 4 | 5 |
|---|---|---|---|---|---|
| Functionalized Br XP-50 A* | (Control) 35.00 | 35.00 | 35.00 | 35.00 | 33.33 |
| Polypropylene | 23.30 | 23.30 | 23.30 | 23.30 | 22.33 |
| N,N'-m-phenylene-dimaleimide HVA-2 | | 0.07 | | 0.07 | 0.07 |
| 2,5-dimethyl-2,5-di(t-butylperoxy)hexane (LUPERSOL L-101) | | | 0.07 | 0.07 | 0.07 |
| Butyl Rubber (Exxon Butyl 268) | | | | | 4.46 |
| TOTAL: | 58.30 | 58.37 | 58.37 | 58.44 | 60.26 |

| Physical Properties | | | | | |
|---|---|---|---|---|---|
| | SAMPLE ID: | | | | |
| Property | 1 | 2 | 3 | 4 | 5 |
| Hardness (shore A&D) | 86/30 | 86/30 | 90/35 | 90/35 | 86/30 |
| UTS (psi) | 877 | 1192 | 1629 | 1773 | 1449 |
| Elongation % | 124 | 137 | 223 | 230 | 204 |
| M 100 (psi) | 867 | 1115 | 1256 | 1338 | 1096 |
| Comp. Set 22 hrs @ 100° C. | 88.6% | 59.4% | 43.5% | 44.7% | 43.4% |
| Wt. Gain 72 hrs @ 125° C. | Failure | 218.9 | 155.5 | 151.6 | 185.1 |
| Tension Set | 54.8% | 38.2% | 24.1% | 26.1% | 22.1% |

*Methacrylate ester 0.57% mole, hydroxybenzophenone 0.34 mole % Mooney $ML_{1+8}$ @ 125° C., 77.

As apparent from Table 1, the thermoplastic vulcanizates which were cured with a peroxide curative, i.e., Examples 3, 4, and 5, had much better properties than Example 1, which did not utilize any peroxide cure, and Example 2, which utilized only a co-curative.

TABLE 2

|  | A | B | C |
|---|---|---|---|
| FUNCTIONALIZED Br XP-50 B* | 100 | 100 | 100 |
| POLYPROPYLENE | 67 | 67 | 67 |
| LUPERSOL L-101 | .2 | .2 | .2 |
| HVA-2 | — | .2 | .2 |
| POLYGARD (antioxidant) | — | .2 | — |
| PHYSICAL PROPERTIES |  |  |  |
| SHORE | 35D | 31D | 32D |
| TENSION SET % | 34 | 33 | 24 |
| UTS, PSI | 1280 | 1430 | 2010 |
| M100, PSI | 970 | 1110 | 1040 |
| M300, PSI | — | — | 1750 |
| UE, % | 280 | 290 | 380 |
| % UNCURED RUBBER CYCLOHEXANE | 12.51 | 8.82 | 4.63 |

*Contains acrylic acid 0.51 mole %, hydroxybenzophenone 0.14 mole %.

TABLE 3

| Composition # | H | I | J | K | L | M | N | O | P | Q | R |
|---|---|---|---|---|---|---|---|---|---|---|---|
| Functionalized Br XP-50 B* | 100 | 100 | 100 | 100 | 100 | 100 | 100 | 100 | 100 | 100 | 100 |
| PP | 67 | 67 | 67 | 67 | 67 | 67 | 67 | 67 | 67 | 67 | 67 |
| HVA-2 | 0.25 | 0.25 | 0.25 | 0.25 | 0.25 | 0.25 | — | — | — | — | — |
| ZnO | — | — | — | 1 | — | — | — | — | — | — | — |
| Hercules S03765 (Accelerator) | — | — | — | — | — | 0.3 | — | — | — | — | — |
| Sartomer 368 (Accelerator) | — | — | — | — | — | — | 0.2 | 0.4 | 0.4 | — | — |
| Saret 623 (Accelerator) | — | — | — | — | — | — | — | — | — | 0.2 | 0.4 |
| Lupersol 101 | 0.1 | 0.2 | 0.4 | 0.4 | 0.05 | — | 0.1 | 0.1 | 0.2 | 0.1 | 0.1 |
| Shore D | 33 | 35 | 35 | 34 | 30 | 31 | 33 | 34 | 36 | 31 | 32 |
| Tension Set, % | 33 | 27 | 28 | 28 | 73 | 72 | 31 | 32 | 24 | 37 | 37 |
| UTS, psi | 1490 | 2130 | 1770 | 1780 | 970 | 990 | 1490 | 1560 | 2130 | 1230 | 1240 |
| M100, psi | 1100 | 1130 | 1040 | 1040 | 950 | 1010 | 910 | 940 | 1090 | 850 | 870 |
| M300, psi | — | 1640 | 1510 | 1530 | — | — | 910 | 1360 | 1680 | 1180 | 1210 |
| UE, % | 280 | 520 | 420 | 430 | 260 | 290 | 400 | 440 | 420 | 370 | 370 |

Table 2 shows the effect of using a co-agent, e.g., HVA-2, on the degree of crosslinking as determined by percent extractable rubber in cyclohexane solvent.

Table 3 shows the effect of different amounts of peroxide with different types of co-agents.

While in accordance with the Patent Statutes, the best mode and preferred embodiment have been set forth, the scope of the invention is not limited thereto, but rather by the scope of the attached claims.

What is claimed is:

1. A thermoplastic vulcanizate composition comprising a blend of:
   (a) a polyolefin derived from monomers having from 2 to 8 carbon atoms, wherein said polyolefin has a melting point of at least 120° C., and
   (b) a functionalized para-alkylstyrene/isoolefin copolymer rubber, wherein said isoolefin of said copolymer is derived from monomers having from 4 to 7 carbon atoms, and wherein said functionalized group is derived from an unsaturated acid or salt thereof having a total of from 4 to 15 carbon atoms, said copolymer rubber being at least partially cured by a free radical source.

2. A thermoplastic vulcanizate composition according to claim 1, wherein said free radical source is an organic peroxide, wherein said unsaturated acid is acrylic acid, methacrylic acid, or combinations thereof.

3. A thermoplastic vulcanizate composition according to claim 2, wherein said thermoplastic polyolefin is polypropylene, wherein said copolymer contains from 50 to about 99.6 percent by weight of repeating units derived from said isoolefin monomers, and wherein the amount of said polypropylene is from about 15 to about 75 parts by weight for every 100 parts by weight of said rubber compound.

4. A thermoplastic vulcanizate composition according to claim 3, wherein said polypropylene is syndiotactic polypropylene wherein the amount of said organic peroxide is from about 0.1 to about 3.0 parts by weight per 100 parts by weight of said rubber, and wherein the degree of cure of said rubber copolymer is at least 75 percent.

5. A thermoplastic vulcanizate composition comprising a peroxide cured blend of polypropylene and a functionalized para-alkylstyrene/isoolefin copolymer rubber, wherein the amount of said polypropylene is from about 15 to about 75 parts by weight of total rubber, and wherein said functionalized group of said rubber is derived from an unsaturated acid having a total of from 4 to 15 carbon atoms, or a salt thereof.

6. A thermoplastic vulcanizate composition according to claim 5, wherein said functionalized group is an acrylate, methacrylate, or a salt thereof, and wherein the amount of said peroxide is from about 0.1 to about 3.0 parts by weight per 100 parts by weight of rubber.

7. A thermoplastic vulcanizate composition according to claim 6, wherein said peroxide is 2,2'-bis (t-butyl peroxy) diisopropyl benzene, 2,5-dimethyl-2,5-di (t-butyl peroxy) hexane, or combinations thereof, and wherein said polypropylene is syndiotactic polypropylene.

8. A thermoplastic vulcanizate composition according to claim 7, wherein the amount of said polypropylene is from about 20 parts to about 70 parts by weight per 100 parts by weight of said total rubber, and wherein the degree of cure of said rubber is at least 75 percent.

9. The composition of claim 1, which has been dynamically vulcanized.

10. The composition of claim 2, which has been dynamically vulcanized.

11. The composition of claim 4, which has been dynamically vulcanized.

12. The composition of claim 5, which has been dynamically vulcanized.

13. The composition of claim 6, which has been dynamically vulcanized.

14. The composition of claim 8, which has been dynamically vulcanized.

* * * * *